(12) United States Patent
Doglioni Majer

(10) Patent No.: US 10,117,541 B2
(45) Date of Patent: Nov. 6, 2018

(54) BEVERAGE DISPENSING MACHINE AND OPERATING METHOD

(75) Inventor: Luca Doglioni Majer, Carate Urio (IT)

(73) Assignee: RHEAVENDORS SERVI CES, S.p.A., Como (IT)

( * ) Notice: Subject to any disclaimer, the term of this patent is extended or adjusted under 35 U.S.C. 154(b) by 0 days.

(21) Appl. No.: 13/602,281

(22) Filed: Sep. 3, 2012

(65) Prior Publication Data

US 2012/0328748 A1 Dec. 27, 2012

Related U.S. Application Data

(63) Continuation of application No. 12/516,709, filed as application No. PCT/IB2007/003770 on Dec. 5, 2007.

(30) Foreign Application Priority Data

Dec. 6, 2006 (EP) .................................... 06025196

(51) Int. Cl.
A47J 31/053 (2006.01)
A47J 31/46 (2006.01)

(52) U.S. Cl.
CPC .................................. *A47J 31/465* (2013.01)

(58) Field of Classification Search
CPC .................................. A47J 31/02; A47J 31/46
USPC ........... 99/299, 302 P, 283, 287, 302 R, 279, 99/282; 251/129.01, 129.02, 129.03, 251/129.04, 129.05, 129.06, 129.07, 251/129.08, 129.09, 129.1, 129.11, 251/129.12, 129.13, 129.14, 129.15, 251/129.16, 129.17, 129.18, 129.19, 251/129.2, 129.21, 129.22
See application file for complete search history.

(56) References Cited

U.S. PATENT DOCUMENTS

| | | | | |
|---|---|---|---|---|
| 3,379,117 | A | * | 4/1968 | Richeson ....................... 99/283 |
| 3,381,604 | A | * | 5/1968 | Bixby, Jr. ...................... 99/283 |
| 3,390,626 | A | * | 7/1968 | Holstein et al. ................ 99/283 |
| 4,497,361 | A | * | 2/1985 | Hajicek ................. F24F 3/1423 165/10 |
| 4,523,503 | A | * | 6/1985 | Julian et al. .................... 83/403 |
| 4,590,835 | A | * | 5/1986 | Matsuo ...................... 83/698.41 |
| 4,968,516 | A | * | 11/1990 | Thompson .................... 426/233 |
| 4,988,967 | A | * | 1/1991 | Miller ...................... F16F 9/46 251/129.05 |
| 5,072,660 | A | * | 12/1991 | Helbling ......................... 99/280 |
| 5,095,875 | A | * | 3/1992 | Morris et al. ................... 83/856 |
| 5,303,639 | A | * | 4/1994 | Bunn et al. ................ 99/289 R |
| 5,312,637 | A | * | 5/1994 | Midden ......................... 426/433 |

(Continued)

FOREIGN PATENT DOCUMENTS

EP  1210893 A2  6/2002
JP  63-312583   12/1988

(Continued)

*Primary Examiner* — Jimmy Chou
(74) *Attorney, Agent, or Firm* — Robert J. Hess; Hess Patent Law Firm

(57) ABSTRACT

A beverage dispensing machine, for instance a coffee machine, provided with a brewing chamber and at least one valve for totally and/or partially blocking the beverage from exiting the chamber. Advantageously, the valve is an electrovalve, in particular a piezoelectric valve, which is continuously controllable to adjust the beverage flow rate being permitted to exit the chamber.

40 Claims, 4 Drawing Sheets

(56) References Cited

U.S. PATENT DOCUMENTS

| | | | |
|---|---|---|---|
| 5,337,652 A * | 8/1994 | Fischer et al. | 99/282 |
| 5,372,832 A * | 12/1994 | Bunn et al. | 426/433 |
| 5,375,508 A * | 12/1994 | Knepler et al. | 99/280 |
| 5,393,540 A * | 2/1995 | Bunn et al. | 426/231 |
| 5,509,349 A | 4/1996 | Anderson et al. | |
| 5,694,824 A * | 12/1997 | Jacko et al. | 83/403 |
| 5,765,467 A * | 6/1998 | Levine et al. | 99/282 |
| 5,773,067 A * | 6/1998 | Freychet et al. | 426/506 |
| 5,813,318 A * | 9/1998 | Zanin et al. | 99/291 |
| 5,865,096 A * | 2/1999 | Kawabata | 99/302 P |
| 6,129,006 A * | 10/2000 | Schmed | 99/302 P |
| 6,142,063 A * | 11/2000 | Beaulieu et al. | 99/283 |
| 6,148,842 A * | 11/2000 | Kappel et al. | 137/79 |
| 6,155,158 A * | 12/2000 | Anson | 99/280 |
| 6,279,461 B1 * | 8/2001 | Fukushima et al. | 99/299 |
| 6,382,083 B2 * | 5/2002 | Schmed | 99/289 R |
| 6,449,532 B1 | 9/2002 | Nicol | |
| 6,526,872 B2 * | 3/2003 | Wong | 99/282 |
| 6,604,455 B2 * | 8/2003 | Areh et al. | 99/510 |
| 6,711,988 B1 * | 3/2004 | Eugster | 99/299 |
| 6,736,796 B2 * | 5/2004 | Shekalim | 604/134 |
| 6,739,240 B2 * | 5/2004 | De Koning et al. | 99/283 |
| 6,968,765 B2 * | 11/2005 | King | 83/403 |
| 7,297,068 B2 * | 11/2007 | Costain | A63D 15/08 473/44 |
| 7,478,812 B2 * | 1/2009 | Sokolov | 273/142 R |
| 7,717,026 B1 * | 5/2010 | Lassota | 99/283 |
| 8,677,888 B2 * | 3/2014 | Santoiemmo | 99/323.2 |
| 2001/0022138 A1 * | 9/2001 | Schmed | 99/299 |
| 2001/0032947 A1 * | 10/2001 | Freisinger | G05D 16/2093 251/30.03 |
| 2002/0007802 A1 * | 1/2002 | Chen et al. | 122/4 R |
| 2003/0126993 A1 * | 7/2003 | Lassota et al. | 99/279 |
| 2004/0079213 A1 * | 4/2004 | Jensen et al. | 83/418 |
| 2004/0237747 A1 * | 12/2004 | King | 83/663 |
| 2005/0167912 A1 * | 8/2005 | Sokolov | 273/142 R |
| 2005/0199844 A1 * | 9/2005 | Gama | F16K 3/085 251/129.05 |
| 2005/0211939 A1 * | 9/2005 | Morisawa | F04B 27/1804 251/129.15 |
| 2005/0247205 A1 * | 11/2005 | Chen et al. | 99/279 |
| 2006/0090653 A1 * | 5/2006 | McDuffie | A47J 31/4407 99/279 |
| 2006/0255064 A1 * | 11/2006 | Donaldson | 222/95 |
| 2007/0028784 A1 * | 2/2007 | Chen | A47J 31/4496 99/513 |
| 2007/0225870 A1 * | 9/2007 | Davidkovich | G05D 16/2013 700/282 |
| 2007/0240550 A1 * | 10/2007 | Jacko et al. | 83/403 |
| 2008/0022822 A1 * | 1/2008 | Jacko et al. | 83/403 |
| 2008/0314257 A1 * | 12/2008 | Kodden | A47J 31/3623 99/302 R |
| 2009/0136639 A1 * | 5/2009 | Doglioni Majer | 426/431 |

FOREIGN PATENT DOCUMENTS

| | | | |
|---|---|---|---|
| JP | 2002170157 A | 6/2002 | |
| JP | 2004174092 A | 6/2004 | |
| NL | 8803146 A | 7/1990 | |
| WO | 2004/089173 A2 | 10/2004 | |
| WO | WO 2006134479 A2 * | 12/2006 | F16K 31/06 |

* cited by examiner

US 10,117,541 B2

BEVERAGE DISPENSING MACHINE AND OPERATING METHOD

CROSS REFERENCE TO COPENDING PATENT APPLICATIONS

The present application is a continuation of Ser. No. 12/516,709 whose '371 date is Jun. 29, 2009, which is a national phase entry from PCT/IB07/03770 filed Dec. 5, 2007.

FIELD OF THE INVENTION

The present invention concerns a beverage dispensing machine and a method for its operation, in particular a fully-automatic or semi-automatic coffee/beverage dispensing machine.

Automatic or semi-automatic machines are known for preparing coffee drinks, or the like, by providing a forced flow of hot water to pass through a brewing chamber containing coffee powder, wherein sometime a mechanic valve is positioned at the exit of the chamber to adjust the backpressure. The valve is calibrated to set both the pressure of the water within the chamber and the time lapse of infusion of the coffee powder.

In general, with beverage dispensing machine it is meant a semi-automatic (the user has to intervene in the preparation of the beverage) or fully automatic machine (preparation of the beverage is carried out automatically by the machine with no need for the user to intervene but for the selection of the desired beverage) for preparing and dispensing a beverage such as, espresso coffee, Americano coffee, cappuccino, latte macchiato, tea, or the like.

DESCRIPTION OF THE PRIOR ART

US 2001/0050002 discloses a machine for preparing an espresso coffee. The brewing chamber comprises a threaded seat, coaxial with the chamber outlet nozzle, wherein a threaded member is inserted which operates as a manually adjustable valve. The threaded member can be screwed within the seat to obstruct the outlet nozzle to a greater or lesser extent, i.e. to partially close the brewing chamber outlet. By adjusting the extent of the insertion of the threaded member within the related seat, the backpressure within the brewing chamber can be adapted to obtain an espresso coffee having the desired organoleptic characteristics. The extent of the insertion of the threaded member within the related seat is provided when the machine is assembled.

U.S. Pat. No. 6,711,988 discloses an espresso machine provided with a piston moveable within the brewing chamber to press the coffee powder contained therein and to adjust the volume of the same chamber. At the chamber outlet, in correspondence of the coffee discharge outlet, a mechanical valve is provided to adjust the backpressure. The valve comprises a spring which supports a ball. Normally the ball is pressed by the spring against the discharge outlet of the brewing chamber, thereby preventing the beverage from exiting the chamber. Only when the pressure of the coffee beverage within the chamber is sufficient to contrast the spring load, then the ball is forced back and the beverage is delivered outside the chamber. Controlling of the operation of the valve is achieved by choosing the compression spring characteristic of the valve spring to be installed.

As a matter of fact, traditional machines do not allow for controlling the operation of the valve which acts as a shutter at the brewing chamber outlet. In other words, known valves mostly operate as on/off valves and cannot be controlled to rapidly, or instantly, adjust the backpressure to the desired extent, for instance in order to compensate for other non optimal operating parameters of the coffee machine.

Also, known valves cannot be set to a backpressure value different from the one corresponding to the initial design value without dismantling the machine or manually adjusting the means for creating the backpressure. This drawback applies not only to espresso coffee machines, but also to other manual or automatic machines for preparing and dispensing espresso and other beverages, such as different kinds of coffee drinks (espresso, Americano, cappuccino, etc.), tea, chocolate, etc., which are usually provided with such known valves.

Therefore, the need is felt for machines, which allow a control of the operation of the brewing chamber outlet valve to modify brewing time and pressure, and also the brewing process, for meeting the user's taste for what concerns the organoleptic characteristics of the prepared beverage.

Another drawback of known beverage dispensing machines is that they require periodical maintenance for cleaning the valve provided at the brewing chamber outlet. Residues of the dispensed beverages, which build up in correspondence of the valve seat, very often jeopardize the proper functioning of traditional valves. In particular the valve body adheres to the related seat due to the adhesive effect of the residues, thereby retarding or preventing opening of the valve.

SUMMARY OF THE INVENTION

It is an object of the present invention to provide a beverage dispensing machine which obviates the aforesaid drawbacks, being at the same time not expensive, simple to operate and easy to keep clean.

It is still another object of the present invention to provide a beverage dispensing machine which allows for rapidly controlling of the beverage flow rate exiting the brewing chamber.

It is a further object of the present invention to provide a beverage dispensing machine which allows for instantly controlling the valve provided at the exit of tie brewing chamber, during the phases of preparing and dispensing the beverage, in order to compensate for possible alterations of other parameters of the machine from the optimal value.

It is a further object of the present invention to provide a beverage dispensing machine provided with a valve within the outlet of the brewing chamber, which valve can be controlled during the phases of preparing and dispensing the beverage in order to affect the brewing conditions, so as to meet the user's preferences with respect to the type and quality of the selected beverage.

These and other objects are achieved by the present invention which relates to a coffee/beverage dispensing machine according to claim 1. The machine may be fully-automatic or semi-automatic.

The invention dispensing machine provides several advantages over prior art embodiments.

Electrovalves are easy to control continuously, e.g. the control unit can operate the electrovalves at each time during the beverage preparation process. Among the electrovalves, piezoelectric valves have a quick response to electric inputs. The control unit of the machine commands the valve by electric signals to rapidly achieve the desired control over the flow rate of the beverage exiting the brewing chamber. The control unit operates on the basis of memorized algorithms.

Advantageously, the electrovalve not only provides an on/off functioning, but does provide also for adjustable choking of the brewing chamber exit.

Preferably the electrovalve is a piezoelectric valve positioned at the exit of the brewing chamber, for instance within the outlet conduit of the same. Alternatively, the piezoelectric valve may be positioned upstream the brewing chamber.

The machine according to the present invention allows for the electrovalve to be electrically controlled to open/close the outlet of the brewing chamber, to the desired extent, during the operation of the machine. The control unit can operate the valve to compensate at least some undesired changes of the machine operative parameters which are preset for a given beverage to be prepared such as, for instance, the temperature of the water supplied to the brewing chamber, the brewing time, the size of coffee powder, the volume of the brewing chamber, etc.

The control can be a "real time" adjusting of the valve at the exit of the brewing chamber, i.e. while the beverage is being dispensed; the control can also be carried out before each preparation of the beverage, i.e. for adapting brewing pressure and time to the type of beverage selected by the customer.

For instance, if the beverage to be dispensed is an espresso coffee, the control unit commands the valve to open the exit of the brewing chamber after a first time lapse and with a selected flow rate. If the beverage to be dispensed after the espresso is an "Americano" coffee, the control unit commands the valve to open the exit of the brewing chamber after a second time lapse, shorter than the first time lapse, and with a higher flow rate.

A further advantage is that the valve according to the invention is simple to clean, especially the piezoelectric valve. The piezoelectric valve can be operated during a stand-by of the dispensing machine, i.e. when no beverage is being prepared, to promote cleaning of the valve shutter member and the related seat. The valve shutter can be rapidly moved within its seat to clean the related surfaces from residues left by the dispensed beverages. In this way maintenance of the valve is simple and effective, with no need for an external operator to intervene often.

BRIEF DESCRIPTION OF THE DRAWINGS

Further advantages and features of the present invention will become apparent from the following detailed description, with reference to the drawings enclosed as a non-restrictive example, where.

DESCRIPTION OF THE PREFERRED EMBODIMENT

Figure 1:
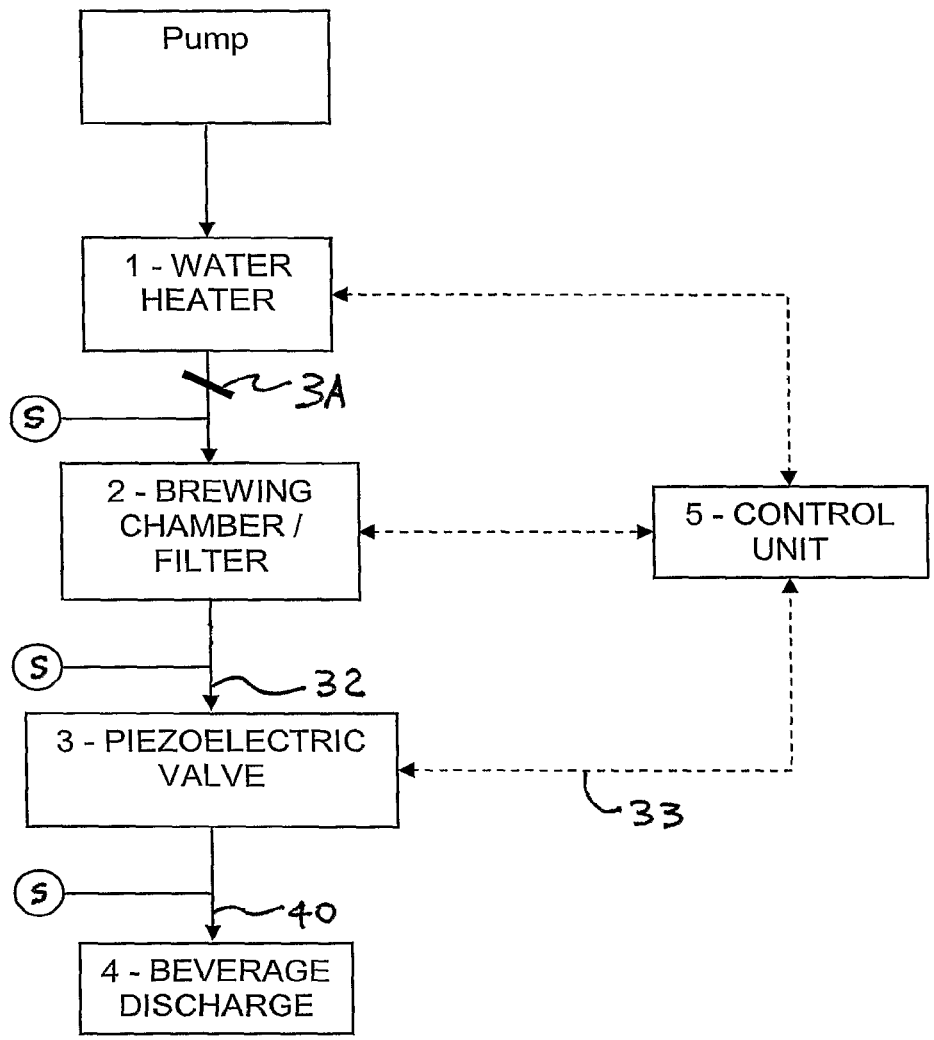
FIG. 1 is a scheme of a beverage dispensing machine according to the present invention.

With reference to FIG. 1, it is shown a simplified scheme of a beverage dispensing machine according to the present invention, provided with a water heater 1, a brewing chamber 2, an electrovalve 3 positioned downstream of the chamber 2 and a discharge section 4 for delivering the beverage to the user. Preferably the electrovalve 3 is a piezoelectric valve, i.e. a valve which can be activated by virtue of the response of a piezoelectric element to electric signals provided by a control unit. Alternatively the electrovalve 3 is a proportional electrovalve. A suitable proportional electrovalve is the series servo-valve sold by the company MOOG Inc.

A control unit 5, for instance an electronic unit, controls at least the valve 3. Preferably the control unit 5 controls the operation of also the water heater 1 and the brewing chamber 2. Control unit 5 runs on the basis of memorized algorithms, which may be software programs, firmware, etc.

The water heater 1 supplies heat to the water which, in turn, is channeled toward the brewing chamber 2 where the beverage is prepared. The water heater may be provided with a temperature sensor, which communicates the temperature of the water to the control unit, thereby allowing the same to interrupt heating the water when the desired temperature is achieved.

The brewing chamber 2 provides for a volume to be totally or partially occupied by the ingredient used for preparing the beverage, for instance coffee powder, tea, milk powder, etc. Normally a piston is moveable within the brewing chamber to press the powder to a given extent, i.e. the piston presses the powder at a preset pressure. Preferably in the machine according to the present invention the control unit controls operation of the piston to adjust the pressure imparted to the powder.

The beverage is prepared by supplying hot water to the powder contained within the brewing chamber. The quality of the prepared beverage, i.e. its organoleptic characteristics, depend on several operating parameters of the machine, such as the brewing time, i.e. the time lapsed during infusion, the pressure of the water supplied to the brewing. chamber, the amount of powder contained therein and the related grain size, the water temperature, etc.

It is evident that the operating parameters should also be set depending on the type of beverage to be prepared and on the user's preferences. For instance, the user may choose between at least two types of coffee: espresso and americano coffee, and for each beverage the machine should meet the user's preferences for what concerns the quality or the organoleptic characteristics, for instance by varying the amount of powder to be provided to the brewing chamber, the water temperature, the grain size of the coffee powder, etc.

The control unit 5 provides for setting of the operating parameters of the machine on the basis of the user's choices. On this purpose, the machine is provided with a user interface allowing the user to select among several settings of the operating parameters. According to the invention, the dispensing machine is provided with at least one electrovalve 3, that is preferably provided downstream of the brewing chamber for controlling the beverage flow rate exiting the brewing chamber. As alternative, the valve 3 is provided upstream of the brewing chamber for controlling the water flow rate entering the brewing chamber. According to another embodiment, two valves are provided, a first one 3A upstream of the brewing chamber and the second one downstream of the same chamber (FIG. 1).

Piezoelectric valves suitable for being used in the machine of the invention are available on the market at low cost and are proved to be reliable. In general such valves have minimum dimensions, thereby being particularly suitable for installation at the exit of the brewing chamber, where usually the room available is limited.

Suitable valves are e.g. those sold by ASCO JOUCOMATIC, series 630, and, more generally, those that can handle flow rates within the range of 1-20 ml/s (when open) and pressures within the range 1.5-20 bar.

Sensors S are provided for measuring the flow rate and/or the pressure and/or the temperature of the flow downstream of the water heater, upstream and downstream of the brewing chamber 2 and downstream of the piezoelectric valve 3.

Figure 2:
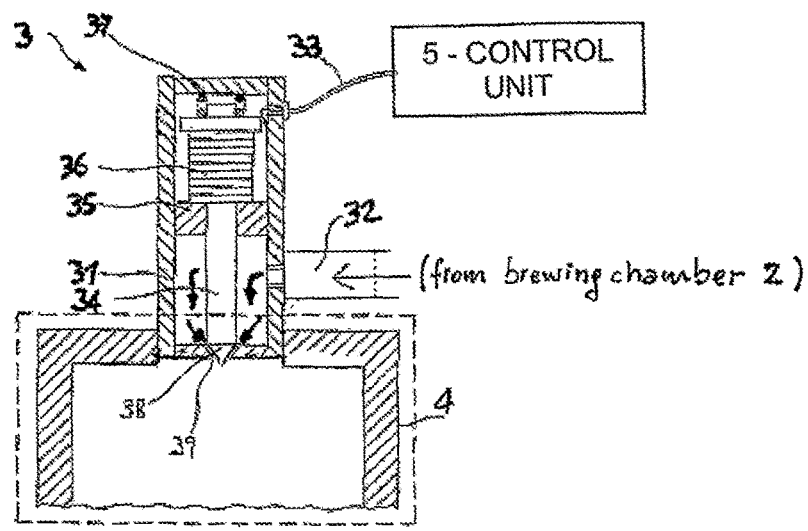
FIG. 2 is a schematic section view of a first piezoelectric valve to be used in the machine according to the present invention.

FIG. 2 shows a section view of a suitable piezoelectric valve 3. The valve 3 comprises a body 31 arranged in fluid connection with the brewing chamber 2 (shown in FIG. 1) directly or through a short passage 32. A shutter 34 is moveable within the body 31 to open/close a discharge outlet 39, which opens into a beverage delivering section 4. The delivering section 4 is for channeling the prepared beverage toward the user's cup, glass or the like.

The shutter 34 may have several shapes. The one shown in FIG. 2 is needle shaped and has a first end coupled to a piezoelectric element 36 and a second distal end 38, which is tapered or conical. The shape of the second distal end 38 is complementary with respect the shape of a seat 39 of the valve body 31.

The shutter 34 slides across the internal wall 35 while being biased by a spring element 37. Normally the shutter 34 abuts the seat 39 with its distal end 38, i.e. normally the valve 3 is closed.

Functioning of the valve 3 is simple. The control unit 5, by means of the electric connection 33, activates the piezoelectric element 36 which expands, at the same time overcoming the force of the spring element 37, thereby causing the shutter 34 to retract its second distal end 38 from the outlet/seat 39. When the outlet 39 is open, the beverage coming from the brewing chamber 2 and entering the valve body 31 is allowed to flow toward the discharge section 4. When the control unit 5 deactivate the piezoelectric element 36, the shutter 34 is pushed by the spring element 37 back in its initial position, thereby causing the second distal end 38 to abut the seat 39, thereby closing the exit and preventing the beverage from flowing outside the valve body 31 toward the delivering section 4.

Advantageously, the stroke of the shutter 34 is directly controllable by the control unit 5 to adjust the flow rate of the dispensed beverage. In particular, the stroke of the shutter 34 depends upon the voltage supplied by the control unit 5 to the piezoelectric element 36.

Figure 3:
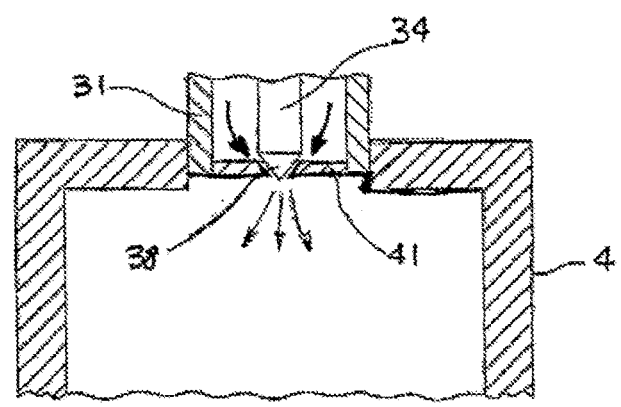
FIG. 3 is a section view of a particular of the valve shown in FIG. 2, in a first configuration.
Figure 4:
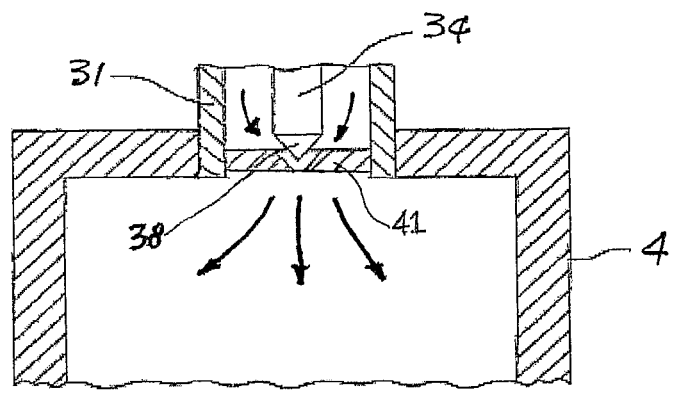
FIG. 4 is a section view of a particular of the valve shown in FIG. 2, in a second configuration.

FIGS. 3 and 4 show, in a section view, a particular of the valve 3. The shutter 34 in FIG. 3 is raised above the seat 39 to a minimum extent to allow a minimum flow rate of the beverage, for instance 1 ml per second of espresso coffee. The shutter 34 in FIG. 4 is raised above the seat 39 to the maximum extent to allow the maximum flow rate of the same beverage, for instance 10 ml per second.

Advantageously the piezoelectric valve 3 allows the control unit 5 for full controlling the beverage flow rate exiting the brewing chamber, i.e. the control unit 5 operates the valve 3 so as to adjust the flow rate from 0 ml/s (or approximately 0 ml/s) to a maximum value of the flow rate, for instance 20 ml/s, preferably so as to maintain the pressure within the chamber 2 substantially constant.

It is to be understood that operation of the valve 3 has effect also on the pressure of the water within the brewing chamber 2. When the valve 3 is closed, the pressure within the chamber 2 builds up while pressurized water is supplied from the water heater, by means of a pump, to the same chamber 2. Depending on the position of the shutter 34, a certain flow rate of beverage may exit the brewing chamber 2, thereby reducing, or preventing, the pressure build up. In this respect, the control unit 5 adjusts the backpressure downstream from the brewing chamber by adjusting the extent of the shutter 34 raising above the seat 39, i.e. by diminishing or increasing the gap between the distal end 38 and the seat 39.

For instance, the control unit 5 adjusts the position of the shutter 34 to increase, reduce or stop the flow rate of the beverage exiting the brewing chamber to, respectively diminish or increasing the infusion time. The control unit 5 may also control the operation of the valve 3 so as to maintain the pressure in the brewing chamber within a preset range, for instance 10 to 15 bar, or to compensate for possible variation in the grain size of the coffee powder. In this respect, the control unit 5 provides for a "real time" feedback control of the piezoelectric valve 3.

In order to clean the valve, the piezoelectric element of the valve, for instance the element 36 in FIG. 2, is excited, i.e. activated, by control unit 5 at high frequency to transmit vibrations to the shutter 34. This is done when the beverage dispensing machine is in stand-by, that is when the machine is not required to prepare a beverage. When the shutter 34 is forced to vibrate, during a cleaning cycle, residues which may be present on the shutter 34 and the seat 39 surfaces are at least partially detached. In other words, vibrations imparted to the shutter 34 and the friction between the distal end 38 and the seat 39 promote detaching of the residues from the surfaces.

The beverage dispensing machine according to the present invention may provide for periodic cleaning cycles of the valve 3, thereby preventing chocking of the seat 39 by the residues of the dispensed beverages and subsequent malfunctioning of the machine.

The valve of the invention machine may be provided with a piezoelectric valve of a different type than valve 3. The shutters and/or the seat are made of piezoelectric materials and the opening/closing are obtained by the expansions of the elements upon supplying a voltage to said shutter and/or to seat elements. This embodiment has the additional advantage of being simple and faster (no springs are required) and of improving the cleaning effect because the valve is vibrated and expanded. The functioning of this embodiment 3' is disclosed with reference to FIG. 5.

Figure 5:
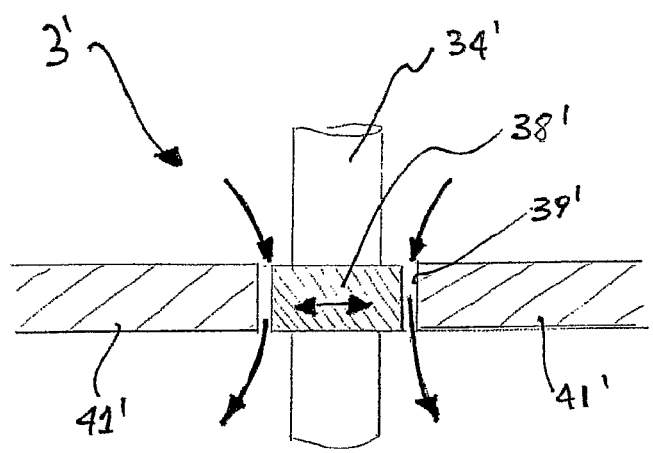
FIG. 5 is a section view of a second piezoelectric valve to be used in the machine according to the present invention.

In FIG. 5 the shutter 38' is a disc fixed onto a support shaft 34'. The wall 41' provides for the seat 39'. Either one of the shutter 38' or the wall 41' is made of a piezoelectric material and is electrically excited by control unit 5. Alternatively both the shutter 38' and the wall 41' are made of a piezoelectric material. When the valve 3' is operated, i.e. when control unit 5 excites the piezoelectric material of the shutter 38' and/or the wall 41', such material undergoes an expansion, that is the dimension change. For instance, when both the shutter 38' and the wall 41' are made of a piezoelectric material, the shutter 38' becomes wider while the seat 39' becomes narrower, thereby chocking or definitely closing the outlet. The extent of the opening of the valve 3' depends upon the entity of the expansion of the piezoelectric material of the shutter and/or the related seat, which expansion is adjusted by powering the material with the proper voltage.

When only the shutter 38' is made of a piezoelectric material, the seat 39' remains still, i.e. does not expand. When only the seat 39', i.e. the wall 41', is made of a piezoelectric material, the shutter 39' remains still, i.e. does not expand.

Cleaning of the valve 3' is accomplished as described above with reference to valve 3, i.e. by vibrating the piezoelectric member (either one of the shutter 38' and the wall 41', or both).

Hereinafter there are disclosed two examples of the operation of the machine according to the present invention, each example being related to the preparation of a specific beverage.

EXAMPLE 1

Coffee 1

An amount of 8 g of coffee powder is loaded in the brewing chamber and pressed by a moveable piston at 10 kg/cm.sup.2. The piston is blocked in its final position, i.e. above the coffee powder, by means of mechanical or electrical restraining devices. The coffee powder is provided by a grinder through a chute extending toward the brewing chamber.

Water is heated by powering the water heater 1 until the temperature sensor measures 90.degree. C. Circulation of the water across the water heater 1 and toward the brewing chamber 2 is provided by a pump (not shown) positioned upstream of the heater 1 (for instance a rotative pump).

An on/off valve, positioned upstream of the brewing chamber 2 is commanded by the control unit 5 to open, thereby allowing the hot water to enter the chamber 2. At this time the piezoelectric valve 3 remains closed and the pressure within the brewing chamber increases.

After a preset time lapse, for instance 5 seconds, the control unit 5 commands the valve 3 to open. The piezoelectric valve 3 is promptly responsive and the shutter 34 is rapidly raised a given extent above the seat 39, this causing the beverage to exit the chamber 2. The pressure within the chamber suddenly drops, for instance from 15 bar to 10 bar. If the user has selected a "strong" espresso coffee, the control unit 5 commands the valve 3 to close again for a short time lapse, for instance 20 ms, in order to promote a pressure recover within the brewing chamber 2. Finally the control unit 5 opens the valve 3 for completing delivering of the beverage to the user.

After a preset time lapse from the beverage discharge, for instance after 30 seconds (or later or once a day), if the machine is not required to prepare a new beverage, the control unit 5 commands the valve 3 to execute one or more cleaning cycle.

Cleaning cycles have a variable duration, for example from 10 seconds to 30 seconds. The piezoelectric element 36 is excited by high frequency impulses provided by the control unit 5 so as to cause rapid vibrations of the shutter 34. In particular, the shutter 34 rapidly moves up and down and repetitively abuts the seat 39. Such vibrations promote detaching of the beverage residues from the surfaces of the same shutter 34 and seat 39.

EXAMPLE 2

Coffee 2

An amount of 10 g of coffee powder is loaded in the brewing chamber 2 and pressed by a moveable piston at 4 kg/cm.sup.2. The piston is then blocked above the coffee powder, within the brewing chamber.

Water is heated by powering the water heater 1 until the temperature sensor measures 80.degree. C.

An on/off valve, positioned upstream of the brewing chamber 2 is commanded by the control unit 5 to open, thereby allowing the hot water to enter the chamber 2. At this time the piezoelectric valve 3 remains closed and the pressure within the brewing chamber increases up to 10 bar.

When the pressure of 10 bar within the brewing chamber is met, or after 2 seconds, the control unit 5 commands the valve 3 to open. The piezoelectric valve 3 is promptly responsive and the shutter 34 is rapidly raised a given extent above the seat 39, this causing the beverage to exit the chamber 2.

Upon completion of the delivering of the beverage to the user, the control unit 5 activates the valve 3 for a cleaning cycle of 5 seconds. During the cleaning of the valve 3 a 5 ml/s flow rate of hot water is supplied to the empty brewing chamber and through the same valve 3 for rinsing the related surfaces and optimize cleaning from residues. Due to the characteristics of the piezoelectric elements, such as element 36, at least a portion of the valve body 31 and the shutter 34 are easily vibrated by powering the same piezoelectric element with proper impulse train. For each cleaning cycle, the element 36 may be electrically excited for 5 s, 10 s, 20, s, 30 s, etc. Cleaning cycles may be frequently provided to avoid build up of residues within the valve 3.

In other words, piezoelectric valves are operable not only for allowing control over the machine operation during brewing of the beverage, but are also operable to provide "self-cleaning" cycle.

Figure 6:
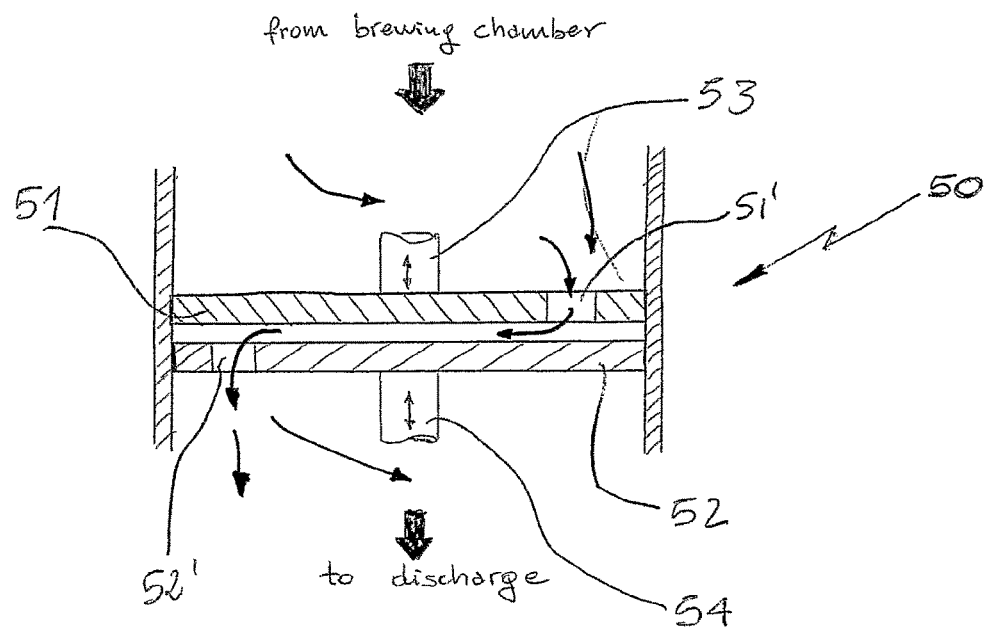
FIG. 6 is a schematic section view of a third valve to be used in the machine according to the present invention.

FIG. 6 shows another piezoelectric valve 50 positioned to intercept the flow at the exit of the brewing chamber. The valve 50 comprises two plate elements 51, 52 each having a through hole 51', 52' for allowing the beverage to flow through the respective element. Holes 51' and 52' are not aligned, but are arranged at opposed sides with respect to the centre of the plate elements. Element 51, 52 are provided with respective shafts 53, 54 at least one of which is made of a piezoelectric material. When the valve 50 is closed, plate elements 51 abut the plate element 52. When the piezoelectric shaft 53 and/or 54 is/are activated, the elements 51 and 52 are separated to the desired extent and a gap is present between them, as shown in FIG. 6, thereby allowing the flow of the beverage to exit the brewing chamber 2 toward the discharge 4.

Figure 7:
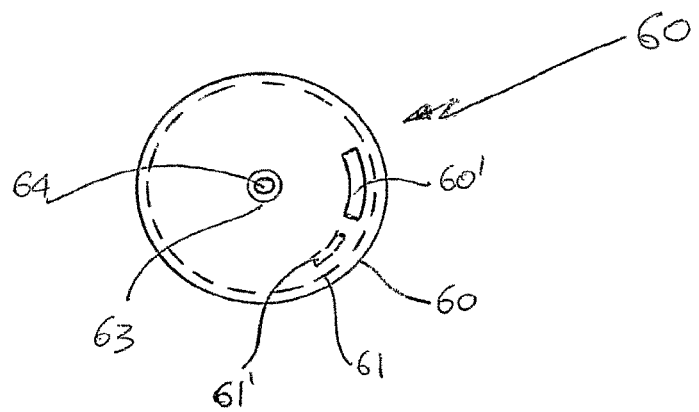
FIG. 7 is a schematic section view of a fourth valve to be used in the machine according to the present invention.

As alternative to the piezoelectric valve 50, a proportional electrovalve may be used (FIG. 7). The valve shown in FIG. 7 comprises two disc plates 60 and 61, similar to the plates 51 and 52, having respective slots 60', 61', arranged at the exit of the brewing chamber 2. The slots 60', 61' are through holes. The disc plates 60, 61 are positioned one abutting the other. At least one disc plate 60 or 61 can be rotated by a respective shaft 63, 64 by an electrically actuated element (not shown). When the slots 60', 61' are mutually arranged as shown in FIG. 7 the valve 50 is closed. When the disc plates 60, 61 are rotated one with respect to the other, the slot 60' intercepts, partially or totally, the slot 61', thereby permitting the beverage to exit the brewing chamber 2. By adjusting the relative rotation of the disc plates 60, 61, i.e. the extent of superimposition of the slots 60' and 61', it is possible to adjust the flow rate which is permitted to trespass the valve 60. It is to be understood that slots 60' and 61' may have a different shape from the one shown in FIG. 7. For instance slots 60' and 61' can be circular holes. What is important is that the valve 60 provides for regulating the flow rate by adjusting the superimposition of the slots 60' and 61'.

What is claimed is:

1. A beverage dispensing machine, comprising
a brewing chamber housing ingredients;
a water heater configured to heat water;
a pump configured to pump and pressurize the heated water so as to feed the heated and pressurized water to the brewing chamber to brew the ingredients within the brewing chamber with the heated and pressurized water to form a beverage;
a beverage delivery section for delivering the beverage;
at least one electrovalve in fluid communication with and between said brewing chamber and said beverage delivery section, said at least one electrovalve having a valve body with a wall that has a discharge opening extending therethrough to form a valve seat, and a shutter movable relative to the valve seat within the valve body between an open position and a closed position, and
a control unit that commands the at least one electrovalve to open into the open position and to close into the closed position and to adjust a flow rate of the beverage exiting the brewing chamber during brewing of the beverage, the control unit commanding the at least one electrovalve in a manner so as to:
attain the closed position by causing a tip of the shutter to abut the valve seat to close the discharge opening, which blocks the beverage from exiting into the beverage delivery section, the tip terminating at a distal point so that as the pump continues to pump the heated water into the brewing chamber, there arises a pressure build-up within the brewing chamber;
attain the open position by adjusting an extent to which the tip of the shutter retracts away from the valve seat into a relative position with respect to the discharge opening that opens the discharge opening sufficient to allow the beverage to exit the brewing chamber and flow into the beverage delivery section via the discharge opening and prevent further continuation of the pressure build-up within the brewing chamber as the pump continues to pump the heated water into the brewing chamber; and
adjust the flow rate of the beverage during brewing of the beverage, the at least one electrovalve being responsive to the control unit to adjust the flow rate of the beverage by raising the shutter above the valve seat by a minimum extent that attains the adjusted flow rate as a minimum flow rate, and the at least one electrovalve being further responsive to the control unit to adjust the flow rate of the beverage by raising the shutter above the valve seat by a maximum extent that attains the adjusted flow rate as a maximum flow rate, the minimum flow rate being greater than a zero flow rate, the maximum flow rate being greater than the minimum flow rate,
wherein the shutter is made of piezoelectric materials that expand to overcome a force of a spring element and to push the spring element in a direction opposite the valve seat, adjust the extent to which the tip of the shutter retracts away from the valve seat and move toward the spring element.

2. The beverage dispensing machine according to claim 1, wherein the at least one electrovalve is operative for cleaning of the shutter and the valve seat by the shutter moving to clean surfaces of the valve seat from residues left by the beverage.

3. The beverage dispensing machine of claim 1, wherein each of the shutter and the valve seat is made of piezoelectric materials, the piezoelectric materials expanding when a voltage is applied thereto.

4. The beverage dispensing machine of claim 1, wherein the wall is further made of piezoelectric material and the control unit excites the piezoelectric material to result in expansion of the piezoelectric material that causes a dimensional change.

5. The beverage dispensing machine of claim 1, further comprising the wall being made of piezoelectric materials, the control unit being configured to activate, by means of an electric connection, the piezoelectric materials to expand, and the control unit further configured to deactivate the piezoelectric materials which allows the shutter to be pushed by the spring element back to the closed position.

6. The beverage dispensing machine of claim 1, wherein the control unit is configured and arranged to operate said at least one electrovalve, on the basis of memorized algorithms, to adjust pressure within the brewing chamber.

7. The beverage dispensing machine of claim 1, further comprising:
means for monitoring one or more operative parameters, the control unit being configured and arranged to operate said electrovalve to adjust pressure within the brewing chamber during said brewing in response to variations of the one or more operative parameters from an expected value to thereby change a flow rate of the brewed beverage exiting the brewing chamber.

8. A method for operating a beverage dispensing machine; comprising:
heating water with a water heater;
pumping the heated water with a pump to pressurize the heated water so as to feed the heated and pressurized water to a brewing chamber that houses ingredients;
brewing the ingredients within the brewing chamber with the heated and pressurized water within the brewing chamber to form a beverage;
delivering the beverage from the brewing chamber to a beverage delivery section via at least one electrovalve that is in fluid communication with and between the brewing chamber and the beverage delivery section, the at least one electrovalve having a valve body with a wall that has a discharge opening extending therethrough to form a valve seat, and a piezoelectric shutter movable relative to the valve seat within the valve body between an open position and a closed position that respectively open and close the discharge opening;
commanding the at least one electrovalve with a control unit in a manner that:
attains the closed position by causing a tip of the piezoelectric shutter to abut the valve seat to close the discharge opening, which blocks the beverage from exiting into the beverage delivery section so that as the pump continues to pump the heated water into the brewing chamber, there arises a pressure build-up within the brewing chamber;
attains the open position by causing the piezoelectric shutter to expand, overcome a force of a spring element push the spring element in a direction opposite the valve seat to cause the tip of the piezoelectric shutter to retract away from the valve seat and move toward the spring element, into a relative position with respect to the discharge opening that opens the discharge opening sufficient to allow the beverage to exit the brewing chamber and flow into the beverage delivery section via the discharge opening and prevent further continuation of the pressure build-up within the brewing chamber as the pump continues to pump heated water into the brewing chamber, the tip terminating at a distal point; and adjusts a flow rate of the beverage during said brewing, the at least one electrovalve being responsive to the control unit to adjust the flow rate of the beverage by causing the piezoelectric shutter to expand and overcome a force of a spring element to cause the piezoelectric shutter to achieve a position above the valve seat by a minimum extent that attains the adjusted flow rate as a minimum flow rate, and the at least one electrovalve being further responsive to the control unit to adjust the flow rate of the beverage by raising the piezoelectric shutter above the valve seat by a maximum extent that attains the adjusted flow rate as a maximum flow rate, the minimum flow rate being greater than a zero flow rate, the maximum flow rate being greater than the minimum flow rate.

9. The method of claim 8, further comprising:
activating the at least one electrovalve to retract the piezoelectric shutter into the open position; and
deactivating the at least one electrovalve to permit the piezoelectric shutter to move into the closed position, the at least one electrovalve maintaining the pressure within the brewing chamber within a preset range during said brewing.

10. The method of claim 8, further comprising:
activating the at least one electrovalve to retract the piezoelectric shutter into the open position; and
deactivating the at least one electrovalve to permit the piezoelectric shutter to move into the closed position, the at least one electrovalve being configured to compensate for possible variation in grain size of the ingredients.

11. The method of claim 8, further comprising:
operating the at least one electrovalve to clean the piezoelectric shutter and the valve seat by moving the piezoelectric shutter to clean surfaces of the valve seat of the at least one electrovalve from residues left by the beverage.

12. The method of claim 8, wherein the valve seat is also made of piezoelectric materials and further comprising supplying a voltage to an associated one of the piezoelectric shutter and the valve seat to expand the associated one of the piezoelectric shutter and the valve seat.

13. The method of claim 8, wherein the wall is also made of piezoelectric material and wherein the control unit f causes the piezoelectric shutter to expand.

14. The method of claim 13, wherein the control unit causes the piezoelectric shutter to expand by applying a voltage thereto.

15. The method of claim 8, further comprising:
operating said at least one electrovalve by the control unit on a basis of memorized algorithms to adjust the pressure within the brewing chamber.

16. The method of claim 8, further comprising:
monitoring one or more operative parameters with a monitoring device; and
operating said at least one electrovalve with the control unit to adjust the pressure within the brewing chamber in response to variations of the one or more operative parameters from an expected value to thereby change a flow rate of the brewed beverage exiting the brewing chamber.

17. The beverage dispensing machine of claim 1, further comprising:
selection means for selecting one of a plurality of different types of the beverage to exit the brewing chamber; and
means responsive to said selection means for preparing the beverage within the brewing chamber by pressing ingredients with a piston within the brewing chamber, and for adjusting pressure within the brewing chamber by opening the discharge opening of the at least one electrovalve to an extent and for a duration that are in correspondence with an extent and a duration necessary to alter the beverage in a manner that yields the selected one of the plurality of different types of the beverage as the beverage discharges from the brewing chamber.

18. The beverage dispensing machine of claim 17, wherein the control unit is configured and arranged to operate said at least one electrovalve on a basis of memorized algorithms to adjust the pressure within the brewing chamber.

19. The beverage dispensing machine according to claim 17, wherein the at least one electrovalve is operative for cleaning of the shutter member and related seat of the at least one electrovalve by the shutter member moving to clean surfaces of the valve seat from residues left by the dispensed beverage.

20. The beverage dispensing machine of claim 19, wherein the at least one electrovalve carries out the cleaning during a standby condition of the beverage dispensing machine.

21. The method of claim 8, further comprising:
selecting one of a plurality of different types of the beverage to exit the brewing chamber;
preparing the beverage within the brewing chamber in response to the selecting by pressing ingredients with a piston within the brewing chamber; and
adjusting pressure within the brewing chamber by directing the at least one electrovalve to open the discharge opening to an extent and for a duration in correspondence with an extent and a duration necessary to alter the beverage in a manner that yields the selected one of the plurality of different types of the beverage as the beverage discharges from the brewing chamber.

22. The method of claim 21, further comprising:
operating said at least one electrovalve by the control unit on a basis of memorized algorithms to adjust the pressure within the brewing chamber.

23. The method of claim 21, further comprising:
operating the at least one electrovalve for cleaning of the piezoelectric shutter member and the seat of the at least one electrovalve by the piezoelectric shutter member moving to clean surfaces of the seat from residues left by the beverage.

24. The method of claim 23, wherein the at least one electrovalve carries out the cleaning during a standby condition of the beverage dispensing machine.

25. The method of claim 8, further comprising adjusting pressure imparted to the ingredients within the brewing chamber.

26. The method of claim 21, wherein the control unit provides feedback control of said at least one electrovalve.

27. The beverage dispensing machine of claim 6, wherein the control unit is configured to control operation of a piston to adjust pressure imparted to the ingredients within the brewing chamber.

28. The beverage dispensing machine of claim 17, wherein the control unit is configured to provide feedback control of said at least one electrovalve.

29. The beverage dispensing machine of claim 1, wherein the at least one electrovalve is configured to handle flow rates within a range of 1-20 ml/s when open and pressures within a range of 1.5-20 bar, said control unit being set to issue a command resulting in a minimum flow rate of 1 ml/s and a maximum flow rate of 20 ml/s.

30. The beverage dispensing machine of claim 1, wherein the at least one electrovalve is configured to handle flow rates within a range of 1-20 ml/s when open and pressures within a range 1.5-20 bar, said control unit being set to issue a command resulting in a minimum flow rate of 1 ml/s and a maximum flow rate of 10 ml/s.

31. The beverage dispensing machine of claim 1, wherein the control unit is configured to control operation of the at least one electrovalve to maintain the pressure in the brewing chamber with a range of 10 to 15 bar.

32. The method of claim 8, wherein the at least one electrovalve is configured to handle flow rates within a range of 1-20 ml/s when open and pressures within a range of 1.5-20 bar, said control unit being set to issue a command resulting in a minimum flow rate of 1 ml/s and a maximum flow rate of 20 ml/s.

33. The method of claim 8, wherein the at least one electrovalve is configured to handle flow rates within a range of 1-20 ml/s when open and pressures within a range of 1.5-20 bar, said control unit being set to issue a command resulting in a minimum flow rate of 1 ml/s and a maximum flow rate of 10 ml/s.

34. The method of claim 8, wherein the control unit controls operation of the at least one electrovalve to maintain the pressure in the brewing chamber with a range of 10 to 15 bar.

35. The beverage dispensing machine of claim 1, wherein the at least one electrovalve is configured to enable choking of the brewing chamber exit and the tip of the shutter is a conical tip tapering to said distal point along a flow direction.

36. The method of claim 8, further comprising activating the at least one electrovalve for choking of the brewing chamber exit.

37. The beverage dispensing machine of claim 1, wherein the shutter made of piezoelectric materials compresses the spring element and causes an edge of the spring element closest to the valve seat, to retract.

38. The beverage dispensing machine of claim 1, wherein the shutter made of piezoelectric materials is completely interposed between the valve seat and the spring element.

39. The method of claim 8, wherein the piezoelectric shutter made of piezoelectric materials compresses the spring element and causes an edge of the spring element closest to the valve seat, to retract.

40. The method of claim 8, wherein the piezoelectric shutter made of piezoelectric materials is completely interposed between the valve seat and the spring element.

* * * * *